United States Patent
VanNahmen et al.

(10) Patent No.: US 10,123,480 B2
(45) Date of Patent: Nov. 13, 2018

(54) SYSTEM AND METHOD FOR CONVERTING CUTTING AND GATHERING SYSTEM OF A CORN HEAD

(71) Applicant: Kopper Kutter, LLC, Cimarron, KS (US)

(72) Inventors: Alan VanNahmen, Manhattan, KS (US); Randy Burns, Cimarron, KS (US); Kyle Kopper, Cimarron, KS (US)

(73) Assignee: Kopper Kutter, LLC, Cimarron, KS (US)

( * ) Notice: Subject to any disclaimer, the term of this patent is extended or adjusted under 35 U.S.C. 154(b) by 74 days.

(21) Appl. No.: 15/383,959

(22) Filed: Dec. 19, 2016

(65) Prior Publication Data

US 2017/0172064 A1    Jun. 22, 2017

Related U.S. Application Data

(60) Provisional application No. 62/430,153, filed on Dec. 5, 2016, provisional application No. 62/386,970, filed on Dec. 18, 2015.

(51) Int. Cl.
*A01D 45/02* (2006.01)
*A01D 101/00* (2006.01)

(52) U.S. Cl.
CPC ........ *A01D 45/023* (2013.01); *A01D 2101/00* (2013.01)

(58) Field of Classification Search
CPC .. A01D 34/661; A01D 57/06; A01D 2101/00; A01D 2023/026;

(Continued)

(56) References Cited

U.S. PATENT DOCUMENTS

| 1,943,201 | A | * | 1/1934 | Bueker | ................... | A01D 34/73 |
| | | | | | | 56/102 |
| 2,372,569 | A | * | 3/1945 | Hahn | ................... | A01D 45/021 |
| | | | | | | 56/107 |

(Continued)

OTHER PUBLICATIONS

Geringhoff Releases the New Milo Star Header for Grain Sorghum Producers, PRNewswire, Nov. 20, 2015, 4 pages, http://www.prnewswire.com/news-releases/geringhoff-releases-the-new-milo-star-header-fo . . . Accessed May 9, 2017.

(Continued)

*Primary Examiner* — Alicia Torres
*Assistant Examiner* — Adam J Behrens
(74) *Attorney, Agent, or Firm* — Husch Blackwell LLP (57) ABSTRACT

A system for modifying a row unit of a harvesting head, the system including at least one cutting disk adapted for being rotatably mounted to the frame of the row unit between a gathering chain drive sprocket and idler sprocket. The cutting disk includes a sprocket attached thereto for being engaged and driven by the gathering chain in order to rotate the cutting disk. Two counter-rotating cutting disks may be provided, each being driven by a separate gathering chain. A method for modifying a row unit includes loosening the gathering chains, removing existing stalk rolls and housings, installing a cover plate over a gearbox to which the housings were mounted, removing existing trash knives, drilling holes in the row unit frame for mounting the cutting disks, installing the cutting disks, and tightening the gathering chains such that the gathering chains engage sprockets attached to the cutting disks.

3 Claims, 9 Drawing Sheets

(58) Field of Classification Search
CPC ............ A01D 2023/028; A01D 41/147; A01D 43/08; A01D 43/081; A01D 43/082; A01D 43/083; A01D 45/021; A01D 45/023; A01D 45/025; A01D 45/02
See application file for complete search history.

(56) References Cited

U.S. PATENT DOCUMENTS

| | | | | |
|---|---|---|---|---|
| 2,527,190 A | * | 10/1950 | Kuhlman | A01D 45/021 460/28 |
| RE25,991 E | * | 3/1966 | Gorham | A01D 43/081 56/503 |
| 3,404,516 A | * | 10/1968 | Carlson | A01D 45/02 56/10.3 |
| RE27,528 E | * | 11/1972 | Looker | A01D 45/006 171/1 |
| 4,048,792 A | * | 9/1977 | Shriver | A01D 43/082 56/98 |
| 4,086,749 A | * | 5/1978 | Greiner | A01D 43/082 56/106 |
| RE31,064 E | * | 10/1982 | Shriver | A01D 43/082 56/106 |
| 4,397,134 A | * | 8/1983 | Lausch | A01D 43/082 56/98 |
| 4,419,856 A | * | 12/1983 | Taylor | A01D 41/147 56/1 |
| 7,874,134 B1 | * | 1/2011 | Hoffman | A01D 45/023 56/119 |

OTHER PUBLICATIONS

MiloStar, https://web.archive.org/web/20160707235503/https://geringhoff.com/products/milostar/, 2 pages. Accessed May 9, 2017.

* cited by examiner

SYSTEM AND METHOD FOR CONVERTING CUTTING AND GATHERING SYSTEM OF A CORN HEAD

CROSS-REFERENCE TO RELATED APPLICATIONS

This Application claims priority to U.S. Provisional Patent Application Ser. No. 62/386,970, filed on Dec. 18, 2015, to Alan G. VanNahmen et al. entitled "Crop Cutting and Gathering System Adaption for a Corn Head or Row Crop Head," the entire disclosure of which is incorporated herein by reference. This Application also claims priority to U.S. Provisional Patent Application Ser. No. 62/430,153, filed on Dec. 5, 2016, to Alan G. VanNahmen et al. entitled "System and Method for Converting Cutting and Gathering System of a Corn Head," the entire disclosure of which is incorporated herein by reference.

BACKGROUND

Agricultural combines are typically equipped with a harvesting head attached to the forward end thereof. Conventional corn heads in particular include a number of row units designed to remove ears of corn from the stalks as the combine moves through the field. To do this, the rows of corn must be guided into narrow gaps of the row units that extend across the width of the head. Convention row units include stalk rolls for pulling the corn stalks through a slot or throat such that the ears of corn are removed from the stalks as the ears come into engagement with opposing deck plates mounted to the row units. Gathering chains with lugs guide the corn stalks into the throat so that the ears may be removed. In this manner, corn heads are particularly designed for harvesting corn, but are not well suited for harvesting other crops such as sorghum, milo, millet, sunflowers, bio-mass crops, and other "cut and harvest" row crops.

Used corn heads can often be acquired on the used or secondary market for a fraction of the cost of a new corn head. However, many of the components of such used corn heads, such as the stalk rolls, trash knives, and deck plates may be worn to a significant degree. Thus, absent costly maintenance and repair, the useful life of a used corn head may be limited. Additionally, many of the components of a conventional corn head, such as the stalk rolls, cast stock roll housings, and trash knives, add significant weight to the corn head thereby affecting the fore-aft stability of the combine both in the field and on the road. Furthermore, other types of harvesting heads, such as rigid platform heads, are not particularly well suited for harvesting down crop.

Accordingly, a need exists for a system and method for converting a corn head such that it can be used to harvest a variety of row crops other than corn. A need also exists for an improved harvesting head designed to pick up and gather downed row crops, while also leaving significant portions of the stalks at the ground. A further need exists for a harvesting head designed to harvest a variety row crops, and that may also be converted back to a conventional corn head.

SUMMARY OF THE INVENTION

One embodiment of the present invention is generally directed to a kit for converting the cutting and gathering system of a harvesting head, such as a corn head or row crop head. More specifically, it is directed to a system for modifying row units of a harvesting head to include counter-rotating cutting disks that are driven by existing gathering chain arrangements. Each kit may include a pair of cutting disks, a sprocket attached to each cutting disk, and a shaft or bolt adapted for rotatably mounting each cutting disk to the frame of the row unit between an existing gathering chain drive sprocket and an existing idler sprocket. The kit may also include replacement deck plates. Various existing components such as stalk rolls, stalk roll housings, and trash knives may optionally be removed from each row unit when the kit is installed. The kit can further include a cover plate that is installed onto a gearbox in place of a stalk roll housing.

Another aspect of the present invention is generally directed to a method for converting a corn head or row crop head though the addition of the counter-rotating cutting disks and the removal of the stalk rolls. In one embodiment of the method, the gathering chains are loosened and then removed. Holes can then be drilled through the frame of the row unit for rotatably mounting each cutting disk thereto in a location between the existing drive sprocket and the existing idler sprocket. Preferably, the cutting disks are mounted closer to the drive sprockets than the idler sprockets. The existing deck plates may be removed and replacement deck plates may be installed in their place. The cover plate may be mounted to the gearbox in place of the stalk roll housing. The gathering chains can be retensioned such that they engage and drive the cutting disks sprockets.

A further aspect of the present invention is generally directed to a harvesting head for a combine that includes row units having cutting disks located between the drive sprockets of the gathering chains and the idler sprockets. The cutting disks each include a sprocket attached thereto that is engaged by the gathering chains to drive the cutting disks in opposite or counter-rotating directions. The outer diameter of each cutting disk sprocket may be larger than the outer diameters of one or both of the drive sprocket and/or idler sprocket such that the gathering chain engages the cutting disk sprocket in two opposing locations.

Other and further objects of the invention, together with the features of novelty appurtenant thereto, will appear in the course of the following description.

BRIEF DESCRIPTION OF THE SEVERAL VIEWS OF THE DRAWING

In the accompanying drawings, which form a part of the specification and are to be read in conjunction therewith in which like reference numerals are used to indicate like or similar parts in the various views.

DESCRIPTION OF THE PREFERRED EMBODIMENT

The invention will now be described with reference to the drawing figures, in which like reference numerals refer to like parts throughout. For purposes of clarity in illustrating the characteristics of the present invention, proportional relationships of the elements have not necessarily been maintained in the drawing figures. It will be appreciated that any dimensions included in the drawing figures are simply provided as examples and dimensions other than those provided therein are also within the scope of the invention.

The following detailed description of the invention references specific embodiments in which the invention can be practiced. The embodiments are intended to describe aspects of the invention in sufficient detail to enable those skilled in the art to practice the invention. Other embodiments can be utilized and changes can be made without departing from the scope of the present invention. The present invention is defined by the appended claims and the description is, therefore, not to be taken in a limiting sense and shall not limit the scope of equivalents to which such claims are entitled.

One aspect of the present invention is directed generally to a kit for converting the cutting and gathering system of one or more row units of a corn head or row crop head. Another aspect of the present invention is directed generally to a method for converting, retrofitting or modifying one or more row units of a corn head or row crop head. A further aspect of the present invention is directed to an improved corn head or row crop head.

Figure 1:
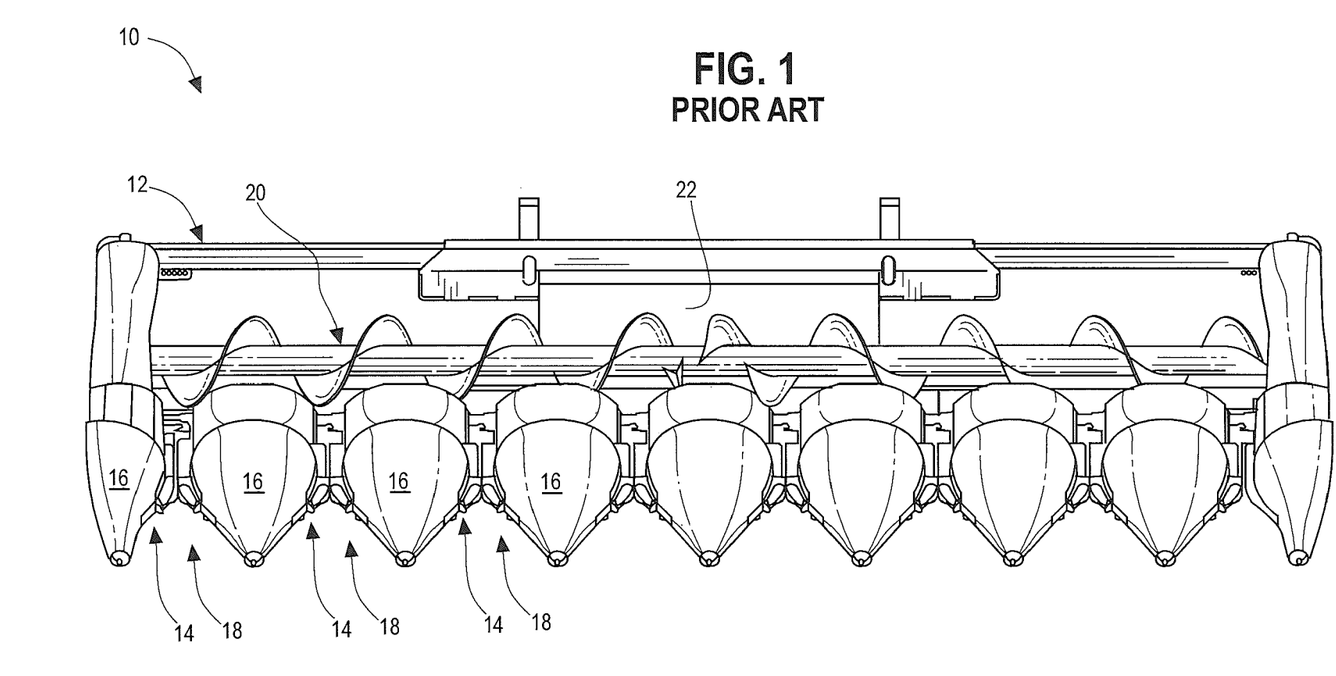
FIG. 1 is a front view of a conventional corn head or row crop head adapted for attachment to an agricultural combine and having a plurality of row units suitable for modification by the present invention.

FIG. 1 illustrates a conventional corn head 10 adapted for attachment to an agricultural combine (not shown). The corn head 10 comprises a frame 12 and a plurality of row units 14 spaced apart from one another and extending from the frame 12 in a forward direction. The corn head 10 also includes a plurality tapered crop dividers or snouts 16 defining longitudinal passages 18 therebetween through which respective rows of crops are directed to the row units 14. The snouts 16 may be pivoted or otherwise raised upwardly into a maintenance position thereby allowing an operator to better access the row units 14 located partially thereunder. A cross auger 20 behind the row units 14 conveys crop material toward an opening 22 so that the crop may be fed into the feederhouse (not shown) of the combine. It will be appreciated that FIG. 1 is also representative of a row crop head as further described below. While the corn head 10 of FIG. 1 includes eight row units 14, it will be understood that the number of row units 14 may be different than eight, and that the present invention is suitable for use with corn heads 10 and row crop heads having any number of row units 14.

Figure 2:
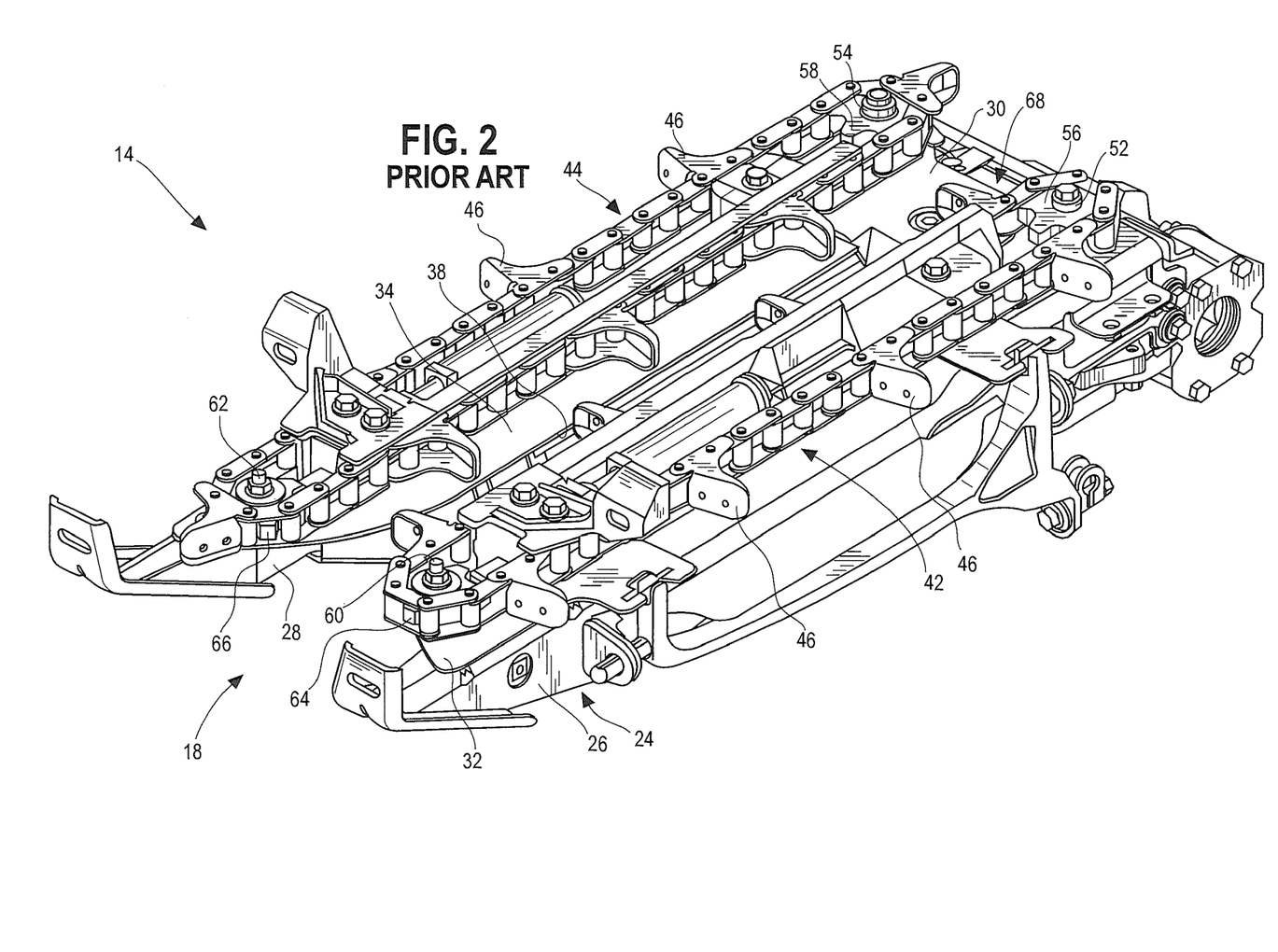
FIG. 2 is a left front perspective view of a row unit of a conventional corn head suitable for modification by the present invention.

FIG. 2 shows an embodiment of a conventional row unit 14. This row unit 14 includes a U-shaped frame 24 (illustrated more clearly in FIG. 4) having left and right longitudinally extending arms or legs 26 and 28 connected to one another by a rear cross member 30. Left and right stripper plates or deck plates 32 and 34 are attached to the upper surfaces of the left and right legs 26 and 28, respectively. The deck plates 32 and 34 can be mounted to the legs 26 and 28 using fasteners. The deck plates 32 and 34 have spaced apart opposing inner edges 36 and 38 (illustrated more clearly in FIG. 3) defining a gap or throat 40 therebetween for receiving the stalks of the crop. Each throat 40 is generally aligned with a passage 18.

Gathering chain assemblies having endless chains 42 and 44 and a series of projecting fingers or lugs 46 are applied to each leg 26 and 28 of the frame 24. The gathering chains 42 and 44 are driven in a counter-rotating manner such that the lugs 46 engage and draw the stalks of the crop from the passage 18 into the throat 40 during the harvesting process. Extending upwardly from openings 48 and 50 (illustrated more clearly in FIG. 4) of the frame 24 are drive shafts 52 and 54 having drive sprockets 56 and 58 mounted thereon. Mounted to tensioning mechanisms at forward regions of the legs 26 and 28 are shafts 60 and 62 having idlers sprockets 64 and 66 mounted thereon. The left gathering chain 42 forms an endless loop around the left drive sprocket 56 and left idler sprocket 64. Similarly, the right gathering chain 44 forms an endless loop around the right drive sprocket 58 and right idler sprocket 66. The drive sprockets 56 and 58 are driven by a gearbox 68 in opposite or counter-rotating directions such that the lugs 46 projecting toward the center of the row unit 14 move in a generally linear manner from the forward end to the rearward end of the row unit 14.

Figure 3:
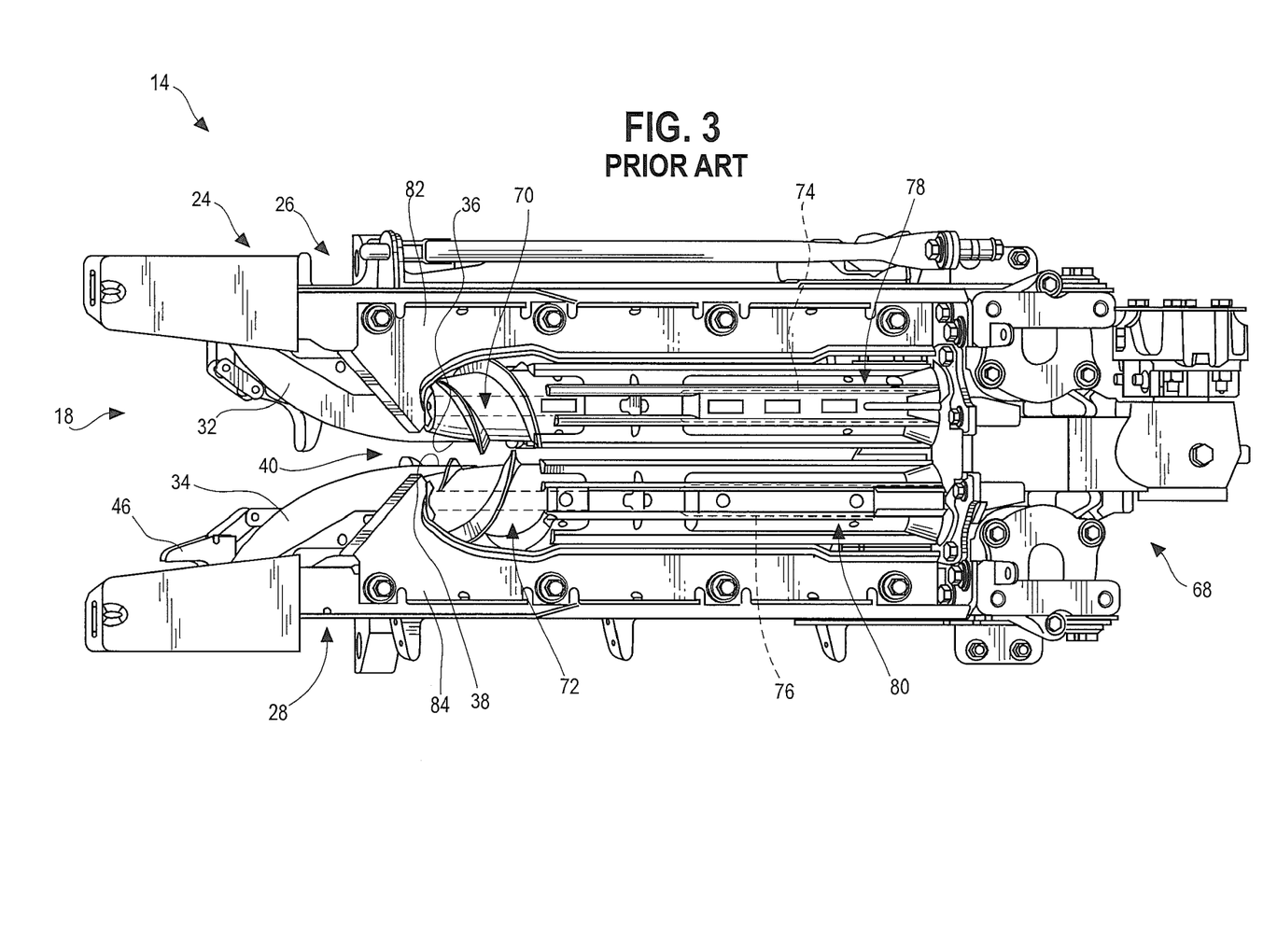
FIG. 3 is a bottom view of the row unit of FIG. 2.
Figure 4:
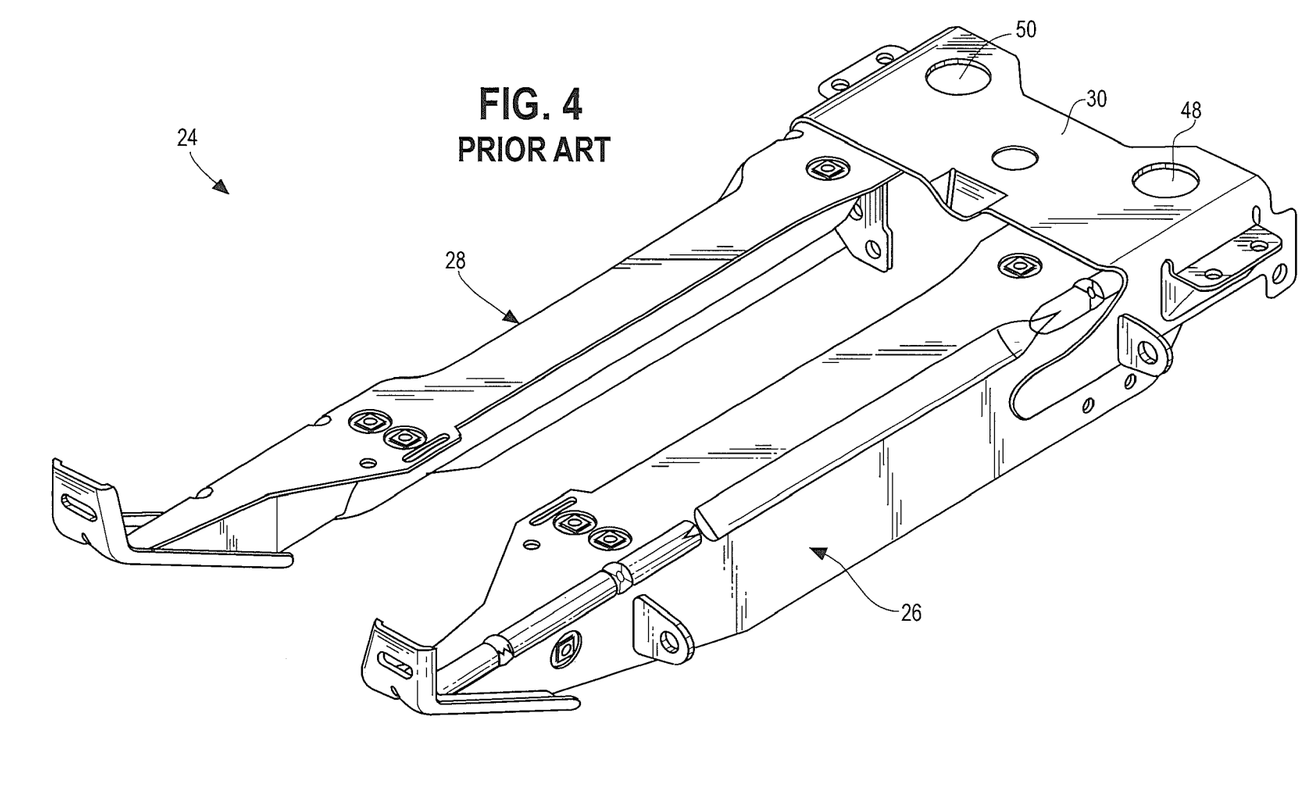
FIG. 4 is a left front perspective view of a frame of the row unit of FIG. 2.

As best seen in FIG. 3, a pair of longitudinally-extending snapping rolls or stalk rolls 70 and 72 are located generally underneath the deck plates 32 and 34. The stalk rolls 70 and 72 are mounted to drive shafts 74 and 76 (shown in broken lines) extending from housings 78 and 80 that are mounted to and project forwardly from the gearbox 68. The stalk rolls 70 and 72 are driven by the gearbox 68 in counter-rotating directions so as to draw the stalks of the crop downward through the throat 40. As the stalks are pulled downwardly, portions of the crop (e.g., ears of corn) which are too large to pass through the throat 40 become detached from the stalks. Attached to a bottom side and extending inwardly from each leg 26 and 28 are trash knives 82 and 84. The trash knives 82 and 84 extend the length of the stalk rolls 70 and 72 in order to prevent debris from becoming tangled about the stalk rolls 70 and 72.

As set forth above, the present invention is suitable for use with both corn heads 10 and row crop heads. Row crop heads include row units that are generally similar in nature to the row unit 14 illustrated in FIGS. 2 and 3. However, instead of having lugs 46 attached to the gathering chains 42 and 44, the row units of row drop heads are often equipped with flat gathering belts or the like which may be attached to the gathering chains 42 and 44, often in a generally corrugated, oscillating, chevron, or wave-like manner using mounting clips or other fasteners.

Figure 5A:
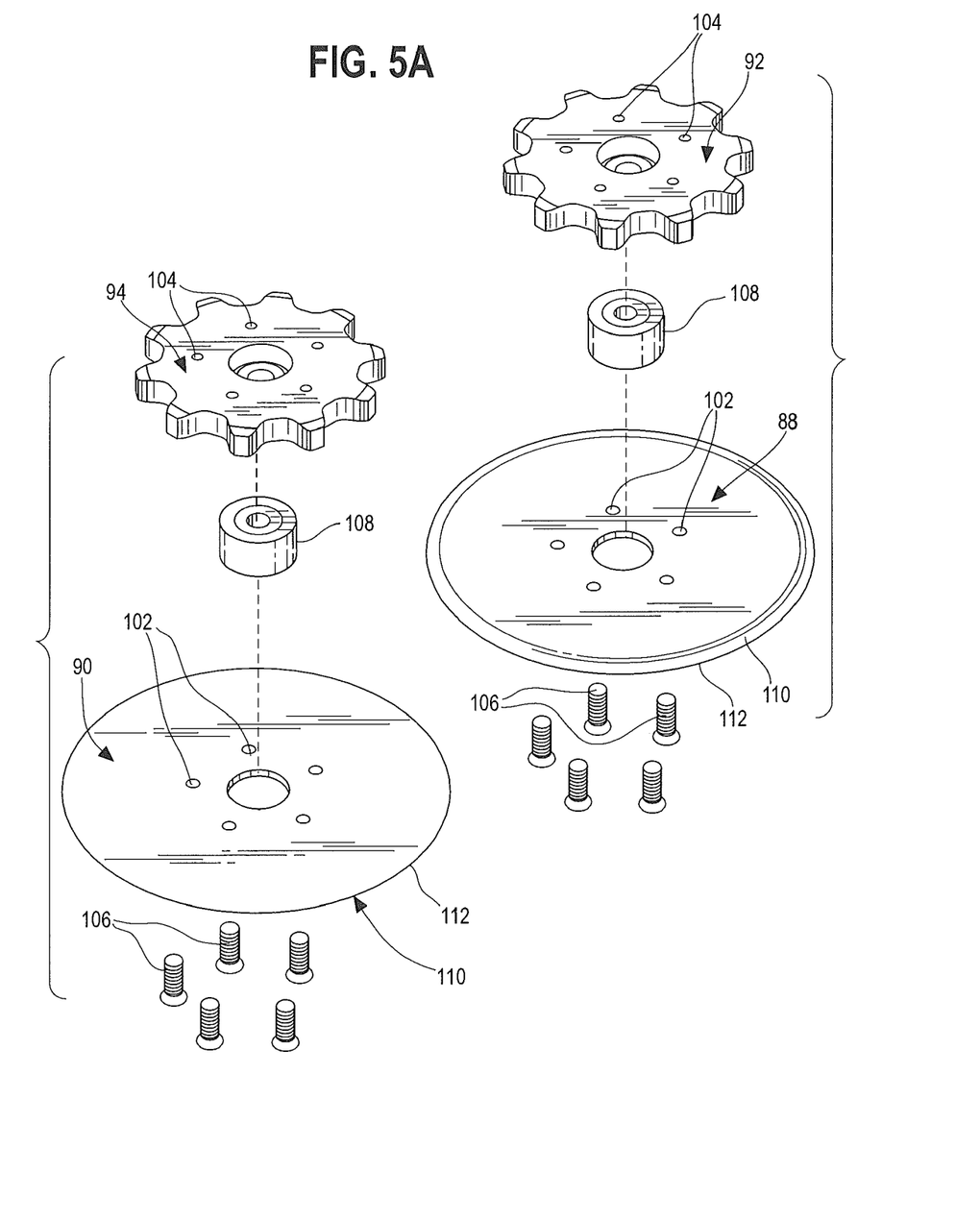
FIG. 5A is an exploded top perspective view of a cutting disk and sprocket assembly in accordance with one embodiment of the present invention.
Figure 5B:
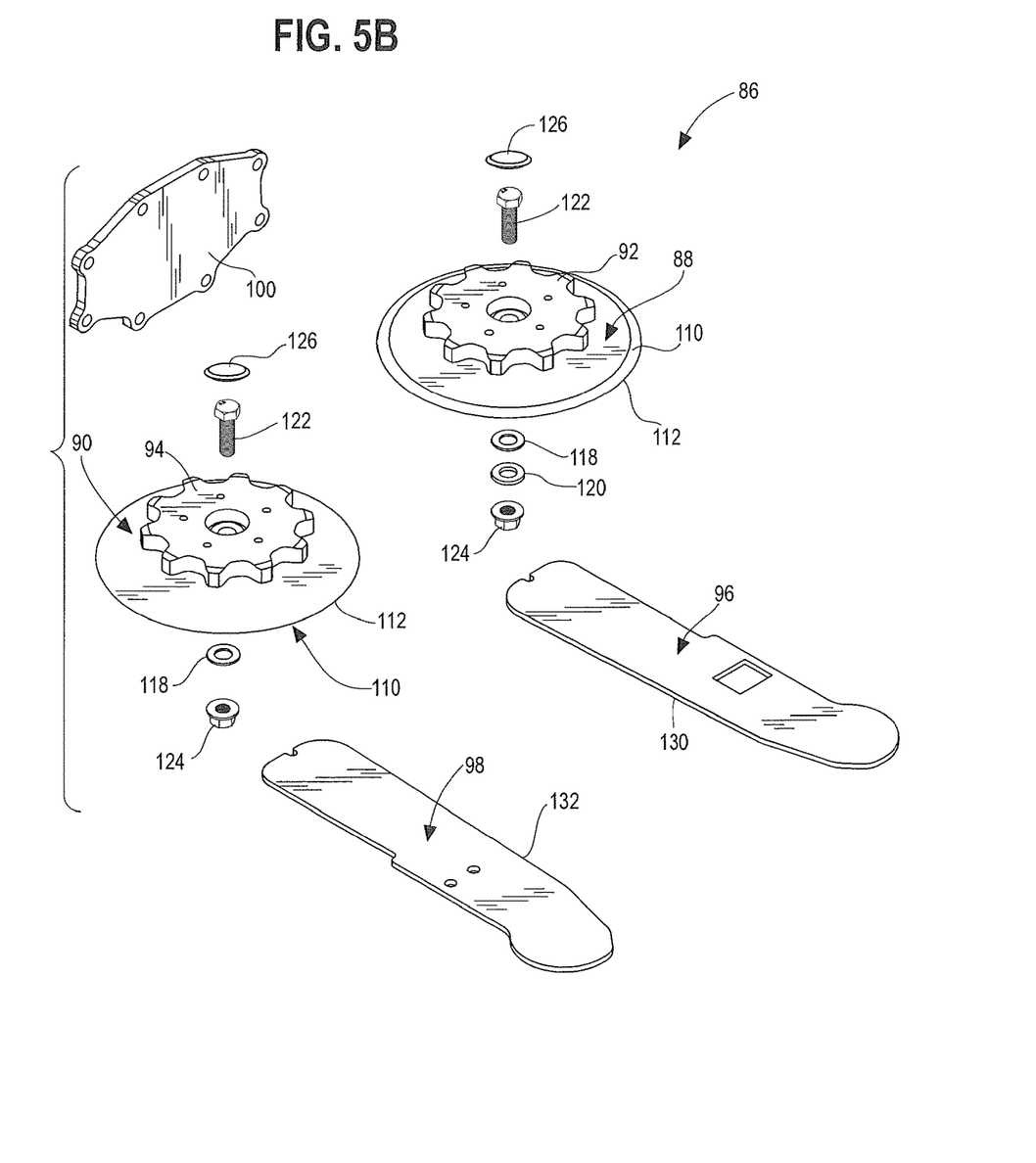
FIG. 5B is a partially exploded top perspective view of a kit for converting a row unit of a corn head or row crop head, the kit including cutting disks, sprockets, replacement deck plates, and a gearbox cover in accordance with one embodiment of the present invention.

FIG. 5B illustrates one embodiment of a retrofitting or conversion kit 86 in accordance with the present invention that may be applied to a row unit 14 of a harvesting head 10. Various embodiments of the conversion kit 86 may be implemented to convert, modify, repurpose and/or retofit harvesting heads sold by various original equipment manufacturers (OEM) such as, for example, John Deere, AGCO, Case IH, New Holland, Geringhoff, Bish Enterprises, and Claas. In one embodiment, the kit 86 can be used to convert a corn head 10 such that it is suitable for harvesting crops in addition to corn, such as sorghum, milo, millet, sunflowers, bio-mass crops, "cut and harvest" row crops, and other crops now known or hereafter developed. The kit 86 can be particularly beneficial in that various worn components of an OEM harvesting head 10 may be removed and/or substituted with components of the kit 86, thereby not only extending the life of the harvesting head 10 but also reducing the weight of the harvesting head 10. Furthermore, the kit 86 may be designed such that its components can be temporarily installed and later removed from the harvesting head 10 thereby allowing it to be converted back to a standard corn head. It will further be appreciated that, in other instances, some or all of the components shown in FIG. 5B may be incorporated with new OEM harvesting heads, either as part of a base model or as optional feature, as opposed to being installed as part of a conversion process.

As shown in FIG. 5B, the kit 86 may include left and right cutting disks 88 and 90, each having a cutting disk sprocket 92 and 94 attached or coupled thereto or otherwise formed therewith as a single component. The kit 86 can also comprise left and right replacement stripper or deck plates 96 and 98, an optional gearbox cover plate 100, and associated hardware.

FIG. 5A depicts components that may be assembled to form subassemblies comprising the cutting disks 88 and 90 and sprockets 92 and 94. The cutting disks 88 and 90 may each include a plurality of mounting holes 102 arranged in alignment with a plurality of mounting holes 104 in the sprockets 92 and 94. Fasteners, such as bolts or screws 106, can be used to secure each cutting disk 88 and 90 to its respective sprocket 92 and 94. In one embodiment, the holes 104 in the sprockets 92 and 94 are threaded and the screws are inserted through the holes 102 of the cutting disks 88 and 90 and threaded into the sprockets 92 and 94. In other embodiments, the screws 106 may be combined with nuts (not shown) to secure the sprockets 92 and 94 to the cutting disks 88 and 90. Bushings or bearings 108 may be provided to facilitate the rotation of the cutting disk/sprocket subassemblies around a shaft or bolt 122 (as discussed below). As shown, the cutting disks 88 and 90 each have a beveled portion 110 to form a circumferential edge 112 suitable for cutting the stalks of the crop being harvested. In other embodiments, the cutting disks 88 and 90 may have beveled, smooth, serrated, jagged, notched, scalloped and/or sawtoothed peripheral regions to facilitate cutting of the stalks as the cutting disks 88 and 90 rotate. The cutting disks 88 and 90 may be identical in size and shape or may be of differing sizes and shapes.

Figure 6:
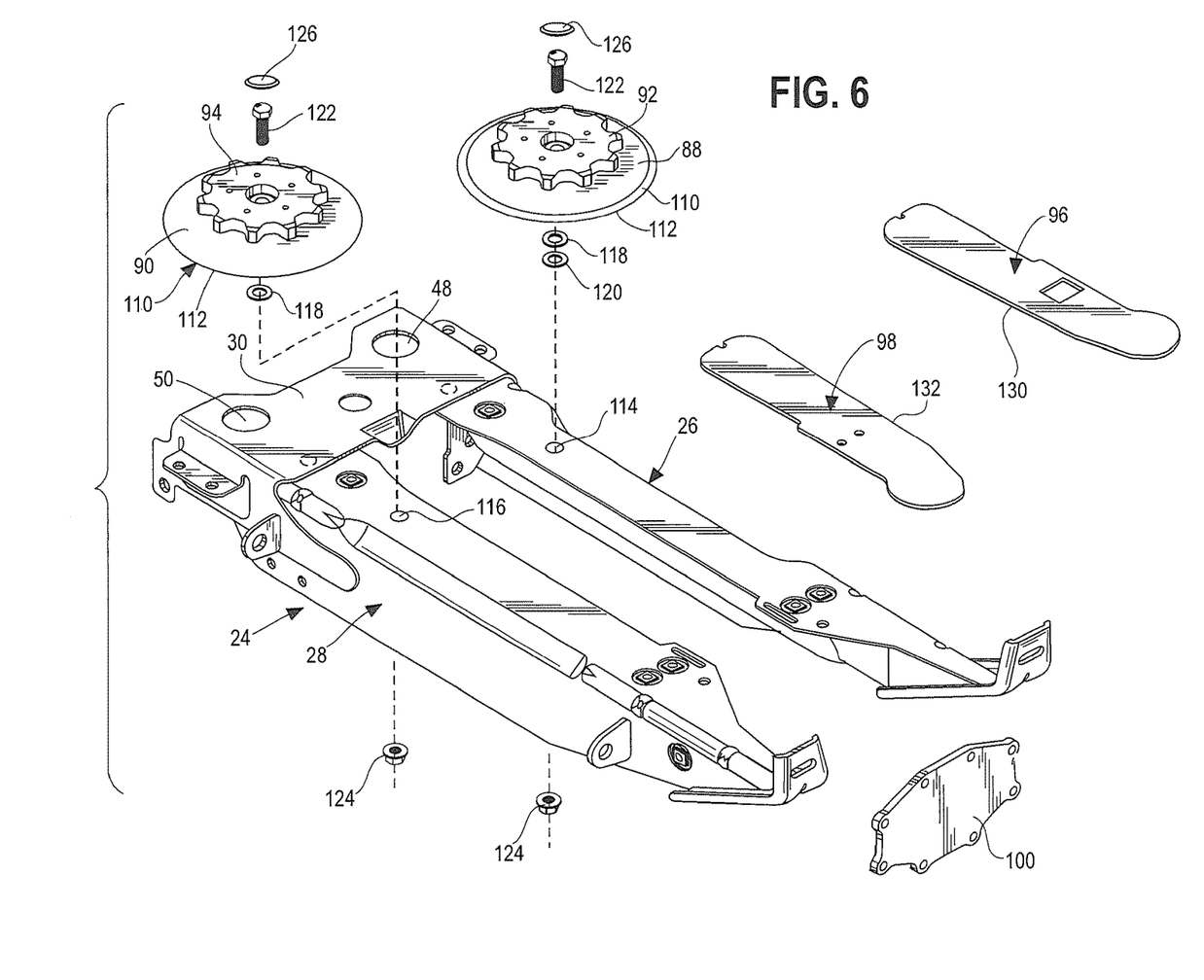
FIG. 6 is a partially exploded right front perspective view of a row unit frame and the kit of FIG. 5B in accordance with one embodiment of the present invention.

Turning attention to FIG. 6, the components of the kit 86 are shown in an exploded state prior to be assembled with the row unit frame 24. As described in more detail below, holes 114 and 116 may be drilled or otherwise formed into the upper surfaces of the left and right legs 26 and 28, respectively, of the frame 24 if such holes are not already provided therein. The newly drilled holes 114 and 116 are located such that the cutting disks 88 and 90 can be located longitudinally between the existing respective drive sprockets 56 and 58 and idler sprockets 64 and 66.

So that the cutting disks 88 and 90 operate at a correct or desired height above the deck plates 96 and 98, one or more spacers, bushings, shims or washers 118 and 120 can be provided underneath each of the cutting disks 88 and 90. It will be appreciated that the spacers, bushings, shims or washers 118 and 120 on each side may be of various thicknesses and/or quantities to achieve proper spacings. As discussed below, more or thicker spacers, bushings, shims or washers 118 and 120 may be applied underneath one cutting disk (e.g., left cutting disk 88) so that it may be positioned above the other cutting disk (e.g., right cutting disk 90) in a slightly overlapping manner. Shafts, bolts 122 or the like are provided for rotatably mounting the cutting disks 88 and 90 to the frame 24. In the illustrated embodiment, the bolts 122 are adapted for extending through the cutting disks 88 and 90, sprockets 92 and 94, washers 118 and 120, and the holes 114 and 116 in the frame 24. The bolts 122 may be secured by nuts 124. Caps 126 can be provided and applied to the hex heads of the bolts 122. It will be appreciated that the shafts for the cutting disks 88 and 90 may be secured or affixed to the legs 26 and 28 in other suitable manners.

Figure 7:
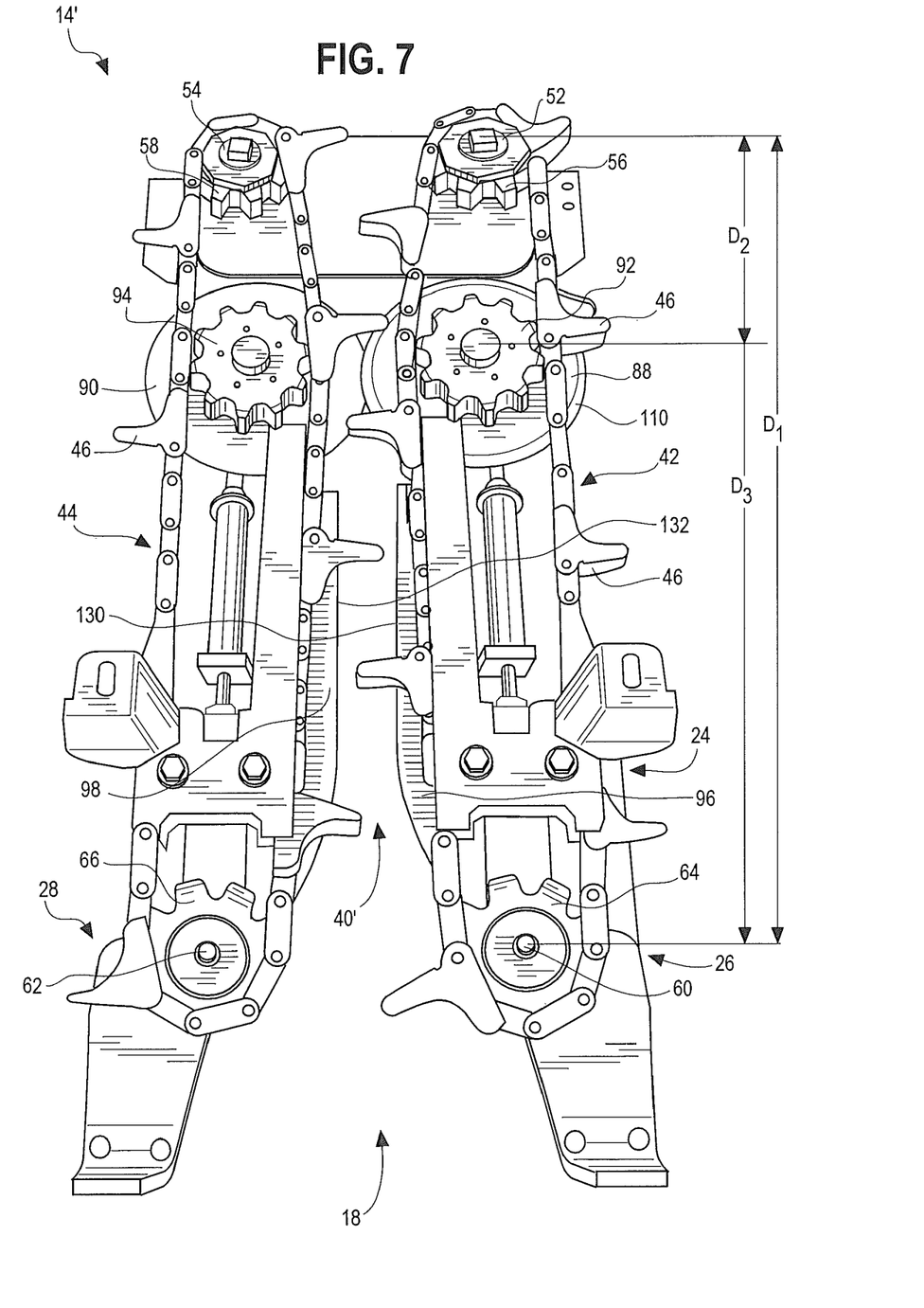
FIG. 7 is a schematic top perspective view of a row unit after it has been converted or retrofitted in accordance with one embodiment of the present invention.

FIG. 7 is a schematic illustration of a row unit 14' that has been converted in accordance with one embodiment of the present invention. In this converted row unit 14', the cutting disks 88 and 90 are rotatably mounted to the row unit frame 24 in a slightly overlapping orientation. The left cutting disk 88 is shown as positioned above the right cutting disk 90, although in other embodiments the left cutting disk 88 may be positioned beneath the right cutting disk 90. As shown, the left cutting disk 88 is mounted such that its beveled portion 110 faces upward, and the right cutting disk 90 is mounted such that its beveled portion 110 faces downward. This results in the unbeveled surfaces of the cutting disks 88 and 90 being generally engaged with one another similar in nature to the two blades of a pair of scissors.

The left gathering chain 42 is looped around the left drive sprocket 56, the left cutting disk sprocket 92, and the left idler sprocket 64. Similarly, the right gathering chain 44 is looped around the right drive sprocket 58, the right cutting disk sprocket 94, and the right idler sprocket 66. The cutting disk sprockets 92 and 94 are engaged by the respective gathering chains 42 and 44 to drive the cutting disks 88 and 80 in opposite, counter-rotating directions. When fully tightened, the gathering chains 42 and 44 may engage the cutting disk sprockets 92 and 94 in a greater degree than that illustrated in FIG. 7. Accordingly, the left cutting disk 88 is driven in a clockwise direction, while the right cutting disk 90 is driven in a counterclockwise direction. In one embodiment, the left cutting disk sprocket 92 has an outer diameter that is larger than that of one or both of the left drive sprocket 56 and/or left idler sprocket 64. Similarly, the right cutting disk sprocket 94 may have an outer diameter that is larger than that of either one or both of the right drive sprocket 58 and/or right idler sprocket 66. In this manner, each cutting disk sprocket 92 and 94 may be engaged in two generally opposing locations by the respective gathering chain 42 and 44. Accordingly, an inner side of each sprocket 92 and 94 may be engaged by the tight side of the respective gathering chain 42 and 44, while the outer side of each sprocket 92 and 94 may be engaged by the slack side of the respective gathering chain 42 and 44.

The close clearance of the lugs 46 of one gathering chain 42 relative to the opposing gathering chain 44 can ensure positive engagement of the gathering chains 42 and 44 with the teeth of the respective cutting disk sprockets 92 and 94. The diameter and position of the cutting disk sprockets 92 and 94 relative to one another may ensure continued positive engagement of the gathering chains 42 and 44 with the teeth of the cutting disk sprockets 92 and 94. In one embodiment, the clearance distance between a lug 46 of one gathering chain 42 and a link plate of the other gathering chain 44 is less than the radial length of the teeth of the cutting disk sprockets 92 and 94 such that one or more of the rollers of the gathering chains 42 and 44 do not become entirely disengaged from a gap defined between two teeth of the sprockets 92 and 94. In other words, the tip of the lug 46 of one gathering chain 42 will come into contact with a link plate of the other gathering chain 44 before a roller(s) of either gathering chain 42 and 44 becomes fully disengaged from the respective sprocket 92 and 94. This ensures positive engagement of each gathering chain 42 and 44 with the respective cutting disk sprocket 92 and 94 without requiring significant wrap engagement of the gathering chains 42 and 44 around many more sprocket teeth. This is, in part, possible since the amount of force required to rotate the cutting disks 88 and 90 may be relatively low and therefore the gathering chains 42 and 44 do not place a significant amount of stress on the teeth of the sprockets 92 and 94.

In alternative embodiments, each sprocket 92 and 94 may be transversely offset (i.e., to the left or right) and only engaged by one side by the respective gathering chain 42 and 44. As the lugs 46 engage and draw, the stalks of the crop from the passage 18 into the throat 40' during the harvesting process, the stalks come into contact with one or both of the counter-rotating cutting disks 88 and 90 in order to be cut.

As depicted in FIG. 7, each cutting disk 88 and 90 is located longitudinally between the respective drive sprocket 56 and 58 and idler sprocket 64 and 66. For example, as shown, the centerline of the left drive sprocket 56 is longitudinally located a distance $D_1$ from the centerline of the left idler sprocket 64. The centerline of the left cutting disk 88 is longitudinally located a distance $D_2$ from the centerline of the left drive sprocket 56 and is longitudinally located a distance $D_3$ from the centerline of the left idler sprocket 64. The ratio of distance $D_2$ to distance $D_1$ can be between about 0.1 and 0.4 in one embodiment, between about 0.2 and 0.3 in another embodiment, and between about 0.1 and 0.2 in a further embodiment. Put differently, the ratio of distance $D_3$ to distance $D_1$ can be between about 0.6 and 0.9 in one embodiment, between about 0.7 and 0.8 in another embodiment, and between about 0.8 and 0.9 in a further embodiment. The longitudinal locations, spacings and ratios of the centerlines of the right drive sprocket 58, right cutting disk 90, and right idler sprocket 66 may be the same or generally similar to those of the left side.

Due to the position of the cutting disks 88 and 90 near the rear of the row unit 14', the stalks are cut near the rear of the row unit 14' thereby leaving more of the stalk at the ground (e.g., 12 inches of stalk or more in some cases) and taking in less stalk and material other grain (MOG) into the combine. A reduction in MOG into the combine leads to greater efficiency, less wear on the combine, and less need to reduce the ground speed of the combine while harvesting. Further, with less MOG being fed into the combine, the internal loading of the combine is reduced and therefore there may be less grain loss. Leaving an increased amount of uncut stalk on the ground also promotes soil conservation as it reduces wind and water erosion. This further leaves more stalk on the ground which may be beneficial in areas of sugarcane aphid (SCA) infestation, leaves more stalk available for grazing, and promotes ground cover in recreational hunting environments.

The converted row unit 14' shown in FIG. 7 includes the left and right replacement deck plates 96 and 98, which have spaced-apart opposing inner edges 130 and 132 defining a gap or throat 40' therebetween for receiving the stalks of the crop. The throat 40' is generally aligned with the passage 18. The throat 40' of the converted row unit 14' may have a width that is greater than or less than the width of the throat 40 of the original row unit 14. The replacement deck plates 96 and 98 may also be of a different size and shape as compared to the original deck plates 32 and 34 and may further be designed to permit the installation of the cutting disks 88 and 90.

Figure 8:
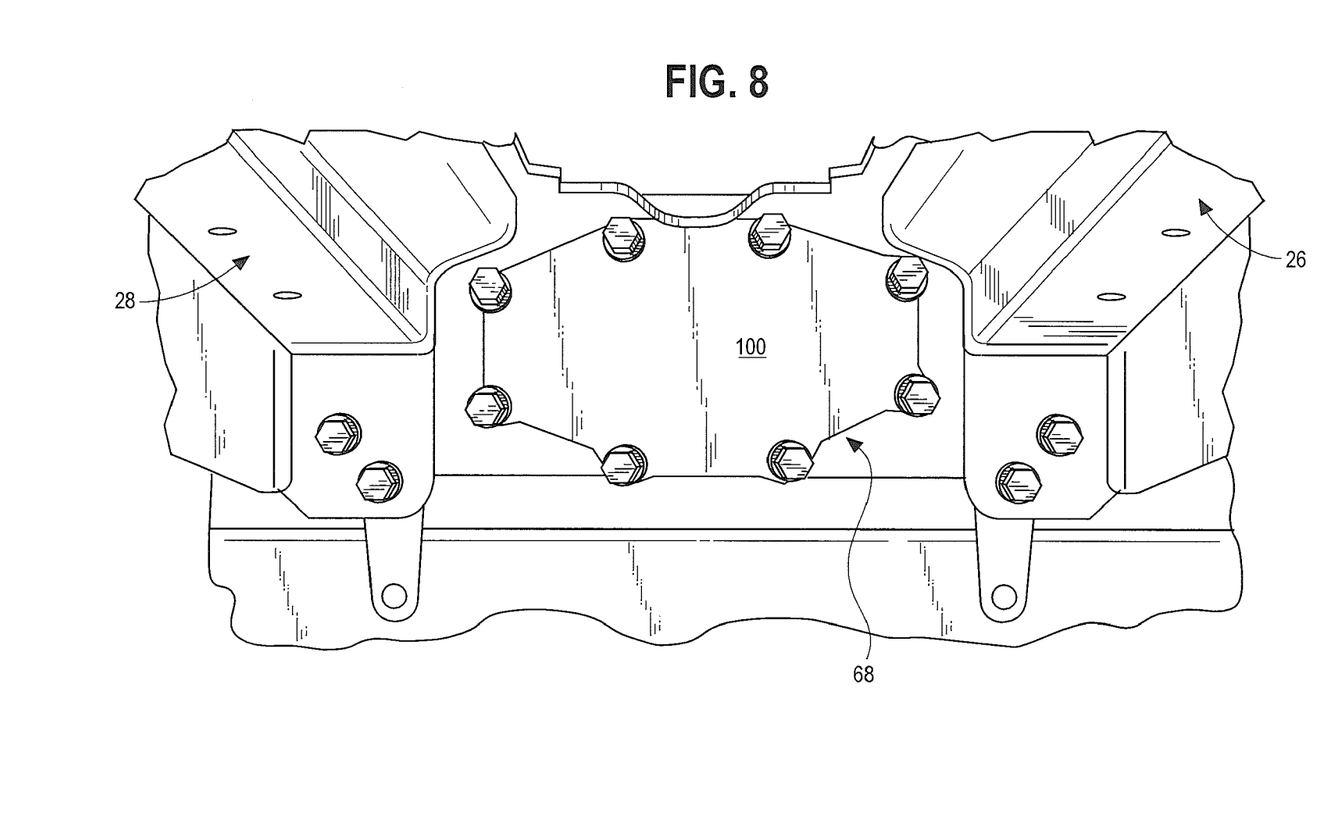
FIG. 8 is a front perspective view a gearbox of a row unit having a cover attached thereto in accordance with one embodiment of the present invention.

As demonstrated in FIG. 7, the stalk rolls 70 and 72, stalk roll drive shafts 74 and 76, and stalk roll housings 78 and 80 have been removed. As shown in FIG. 8, the gearbox cover plate 100 has been mounted to the gearbox 68 in place of housings 78 and 80. The trash knives 82 and 84 can be removed from the converted row unit 14' as well.

Turning attention now to the method for converting a harvesting head 10, the crop dividers or snouts 16 are first raised in order to gain access to the row units 14. The gathering chain tensioning/adjusting mechanisms are loosened so that the gathering chains 42 and 44 may be loosened and/or removed. The original deck plates 32 and 34 and idler sprockets 64 and 66 can then be removed. The trash knives 82 and 84 can also be removed. The stalk rolls 70 and 72 can then be removed. Next, the stalk roll housings 78 and 80 with stalk roll drive shafts 74 and 76 may be removed. The gearbox cover plate 100 may then be attached to the gearbox 68 in place of the cast stalk roll housing body.

A template may optionally be placed on the upper surfaces of the frame legs 26 and 28 in order to mark and/or drill pilot holes for holes 114 and 116. Holes 114 and 116 can then be drill or otherwise formed through the upper surfaces of the legs 26 and 28 of the frame 24.

The cutting disks 88 and 90, along with the cutting disk sprockets 92 and 94, may then be rotatably mounted to the legs 26 and 28 using a shaft or bolt 122. Various thicknesses and quantities of spacers, bushings, shims or washers 118 and 120 may be used to achieve the desired spacing of the cutting disks 88 and 90 above the legs 26 and 28 and/or deck plates 32 and 34. As set forth above, the cutting disk sprockets 92 and 94 may be mounted in locations relative to one another (i.e., having a transverse spacing) so as to prevent disengagement of the gathering chains 42 and 44 due to the close clearance of the lugs 46 of one gathering chain 42 relative to the other gathering chain 44. In some embodiments, modified gathering chain guides and/or stalk guides are also installed. The replacement deck plates 96 and 98 and idler sprockets 64 and 66 can then be installed. If necessary, links may be added to the gathering chains 42 and 44. Next, the gathering chains 42 and 44 are reinstalled and retightened or retensioned such that they engage the cutting disk sprockets 92 and 94.

From the foregoing, it will be seen that this invention is one well adapted to attain all the ends and objects hereinabove set forth together with other advantages which are obvious and which are inherent to the structure. It will be understood that certain features and sub combinations are of utility and may be employed without reference to other features and sub combinations. This is contemplated by and is within the scope of the claims. Since many possible embodiments of the invention may be made without departing from the scope thereof, it is also to be understood that all matters herein set forth or shown in the accompanying drawings are to be interpreted as illustrative and not limiting.

The constructions described above and illustrated in the drawings are presented by way of example only and are not intended to limit the concepts and principles of the present invention. Thus, there has been shown and described several embodiments of a novel invention. As is evident from the foregoing description, certain aspects of the present invention are not limited by the particular details of the examples illustrated herein, and it is therefore contemplated that other modifications and applications, or equivalents thereof, will occur to those skilled in the art. The terms "having" and "including" and similar terms as used in the foregoing specification are used in the sense of "optional" or "may include" and not as "required". Many changes, modifications, variations and other uses and applications of the present construction will, however, become apparent to those skilled in the art after considering the specification and the accompanying drawings. All such changes, modifications, variations and other uses and applications which do not depart from the spirit and scope of the invention are deemed to be covered by the invention which is limited only by the claims which follow.

What is claimed is:

1. A method for converting a corn head or row crop head, the method comprising the steps of:
    loosening a gathering chain of a row unit of the corn head or row crop head;
    mounting a cutting disk to a frame of the row unit between a drive sprocket and an idler sprocket, the cutting disk having a cutting disk sprocket attached thereto;
    tightening the gathering chain such that the gathering chain engages the cutting disk sprocket; and
    removing stalk rolls from the row unit.

2. The method of claim 1 further comprising the step of removing a stalk roll body from a gearbox of the row unit.

3. The method of claim 2 further comprising the step of installing a cover plate on the gearbox after the stalk roll body is removed from the gearbox.

\* \* \* \* \*